United States Patent [19]
de Mesquita Cardoso

[11] 3,909,121
[45] Sept. 30, 1975

[54] PANORAMIC PHOTOGRAPHIC METHODS
[76] Inventor: Edgar Antonio de Mesquita Cardoso, Avenida Almirante Gago Coutinho 92, Lisbon, Portugal
[22] Filed: June 25, 1974
[21] Appl. No.: 482,839

[52] U.S. Cl. .................................. 352/44; 352/69
[51] Int. Cl.² ...................................... G03B 37/00
[58] Field of Search ............................ 352/69, 44

[56] References Cited
UNITED STATES PATENTS
| | | | |
|---|---|---|---|
| 2,068,410 | 1/1937 | Hanke | 352/69 |
| 2,815,701 | 12/1957 | Back | 352/69 X |
| 2,972,281 | 2/1961 | Dresser | 352/69 |

Primary Examiner—Monroe H. Hayes
Attorney, Agent, or Firm—Waters, Schwartz & Nissen

[57] ABSTRACT

A panoramic photographic process which employs a photographic instrument having an objective lens with an optical axis, an aperture in front of the lens, and a film guide in back of the lens for travel of film therealong. The method comprises advancing the film along the guide at a predetermined rate of speed, while rotating the instrument about an axis passing through the lens and extending at an angle to the optical axis, the direction and speed of rotation of the instrument being such that the net velocity of travel of the film is substantially zero so that it serves as an instantaneous center of rotation thereby enabling the photographing of the panorama situated above the natural or artificial horizon.

11 Claims, 11 Drawing Figures

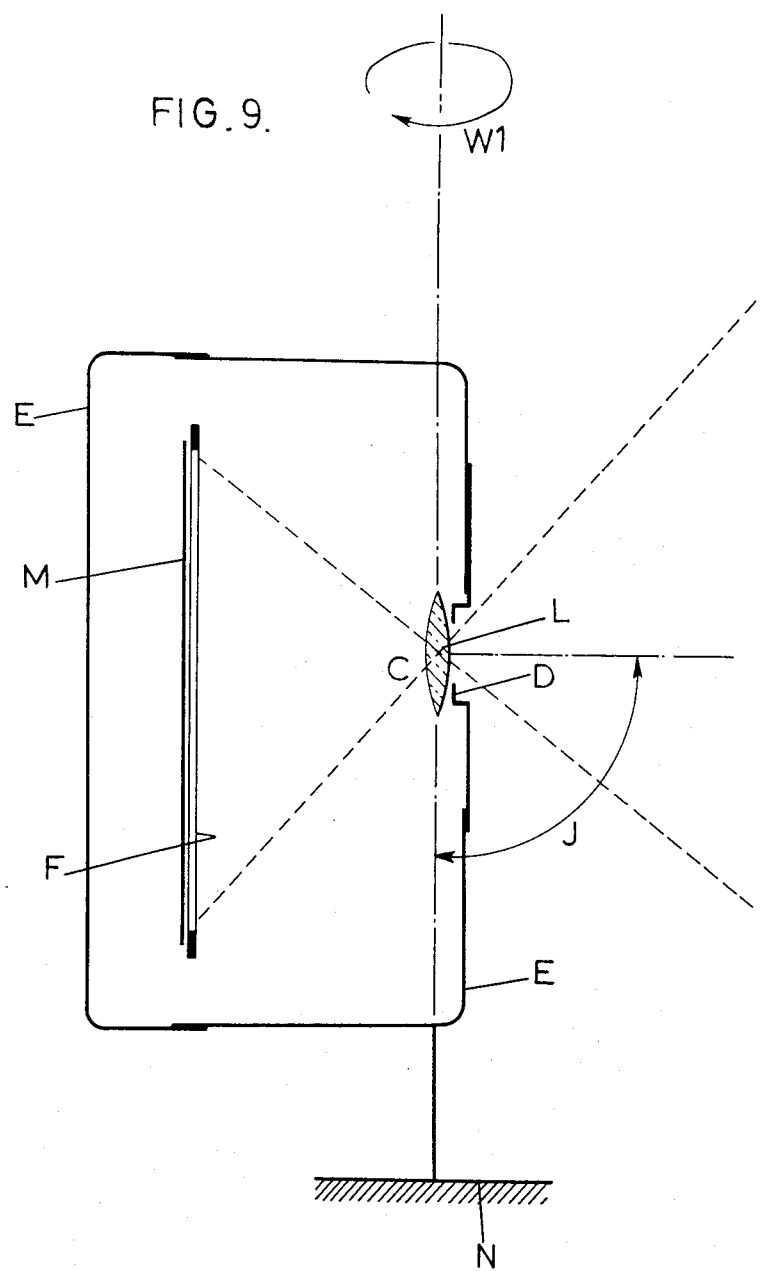

PANORAMIC PHOTOGRAPHIC METHODS

FIELD OF THE INVENTION

The invention relates to a method for continuous filming and subsequent projecting of a panoramic region situated above a natural or artificial horizon over horizontal azimuth angles of 360° or multiples thereof or any selected smaller angle.

BACKGROUND AND SUMMARY OF THE INVENTION

The principle of the photographic method in accordance with the present invention, consists in maintaining the net velocity of travel of the film, relative to the support location of the film machine, at a value of about zero so that the portion of the film which at each instant is to be exposed in the case of a camera or illuminated (in the case of a projector) is an instantaneous center or rotation. This is effected by rotating the film machine, with the objective fixed therein about an axis normal or oblique to the optical axis of the objective. The objective can be a single lens in which case the axis of rotation will pass through the optical center of the lens or it can be an assembly in which case the axis of rotation will pass through the nodal point thereof. Hereafter for purposes of simplicity the objective will be termed an "objective lens" and the axis of rotation will be considered as passing through the optical center thereof and this will be taken as equivalent to the arrangement of an assembly with the axis passing through the nodal point.

Thus the known property of objective lenses is utilized for maintaining fixed the images which they project on the film, or transmit therefrom onto the screen, when the objective lens revolves about said axis.

According to the method of the invention, the images are reproduced with surprising sharpness and, when the machine revolves around a vertical axis of rotation, they appear vertical and do not converge or distort, thereby overcoming one of the main deficiencies of conventional machines.

To obtain photographs by the process of the invention, the corresponding filming machine is placed at a selected location and is rotated about said axis and continuously receives the images from the scanned panorama. The speed of rotation can be selected by the operator who also determines whether integral or fractional numbers of revolution are to be made.

The photography is continuous and without limitation of angle or rotation and the machine can expose the film repeatedly to the entire panorama, receiving in its successive revolutions the repeated images of the panorama and that which is in motion therein. A machine with an adequate number of revolutions per second will then be a cinematographic filming machine.

If, in its continuous movement of rotation, the machine revolves about a vertical axis, the images received of vertical lines will likewise appear vertical, and without any distortion, contrary to what happens in conventional machines.

Now, if, in such a machine, exposed film is inserted and it is illuminated strongly from behind the objective lens, when the machine rotates, it will operate as a projector, continuously projecting during rotation, the image onto the screen to reproduce the panorama.

If the exposure of the film and its subsequent projection is made at high speed there will result a total panoramic motion picture and motion picture projection, in complete revolutions of the entire panorama above the selected horizon.

Naturally, by adopting suitable speeds of rotation in the "filming" and "projecting" machines, one can accelerate or retard, as desired, the speeds of motion of the images of the moving bodies in the panorama, in relation to their actual speeds.

As the movement of the film is continuous, whether during exposure or projection, the film can be used to form thereon a sound track or magnetic, optical or other track, with any desired bands, corresponding to the pickup in the various sectors of the panorama and to its later reproduction in the corresponding sectors of the screen used in the cinema. Thus, there is also provided an illusion of reality with respect to the location of the emission of sound.

BRIEF DESCRIPTION OF THE DRAWING

FIG. 9 is a diagrammatic vertical sectional view through the apparatus of FIG. 8;

DETAILED DESCRIPTION

In conventional photography be it still or moviemaking, the film is maintained at rest at the time of exposure. In order to film a panorama, the camera is panned and a succession of pictures are taken until the panoramic field is covered. Wide lenses are employed to cover as large a field as possible for photographic large panoramic scenes with a minimum of panning. However, when a scene is to encompass 360° or even much smaller angles, it is absolutely necessary to pan the camera so that a succession of pictures are taken to cover the extent of the scene.

The application of the process in question will now be described in detail.

Figure 1:
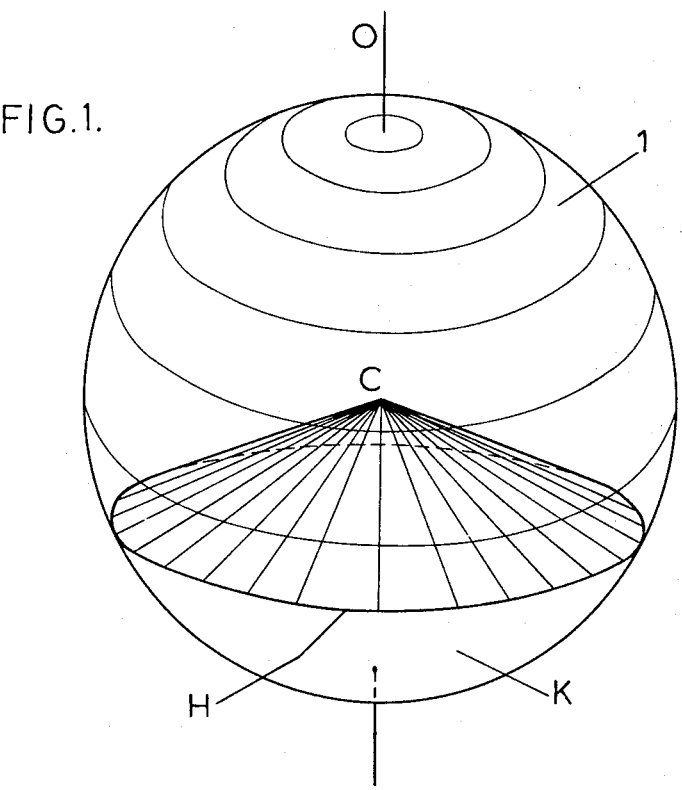
FIG. 1 is a schematic illustration showing a panoramic region which can be photographed by means of the method of the invention.

Assuming that the panorama to be photographed resembles a hollow sphere at the center C of which the camera is placed as shown in FIG. 1, the camera can now photograph by continuous movement of rotation, the entire inner surface of the sphere I, except that portion thereof K, situated below the horizon H and delimited by a cone whose apex is at C.

Conversely, for projection of the exposed film, a projector is disposed at center C of a screen whose inner surface is spherical and there is projected on the screen the successive filmed images thus realizing a total panoramic projection or cinematographic presentation above the selected horizon.

Figure 2:
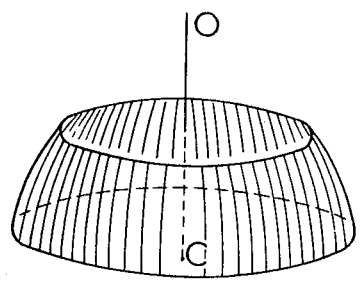
FIGS. 2–7 are schematic illustrations of different panoramic regions and corresponding projection screens.
Figure 5:
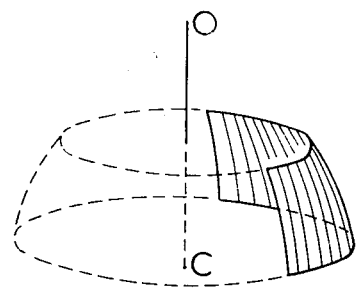
Figure 3:
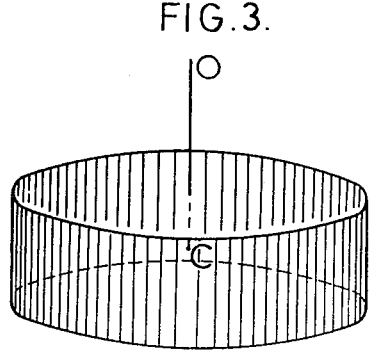
Figure 6:
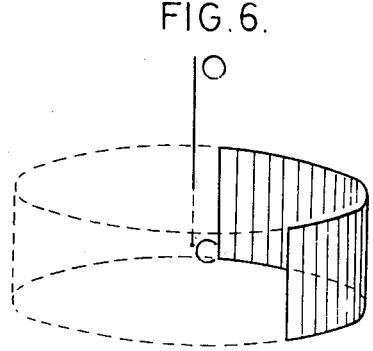
Figure 4:
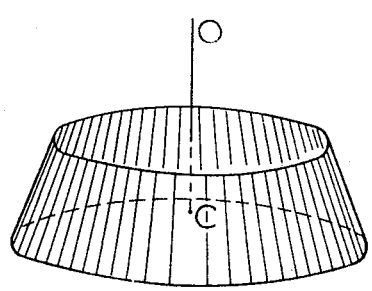
Figure 7:
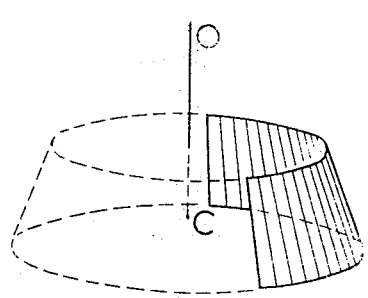

The method of the invention is applicable to photographing and projecting panoramic regions of annular shape which are spherical as in FIG. 1, cylindrical or conical as in FIGS. 2, 3 and 4, and also to partial sectors of such regions as in FIGS. 5, 6 and 7.

In the regions of FIGS. 1–7, the axis is not necessarily vertical.

Figure 8:
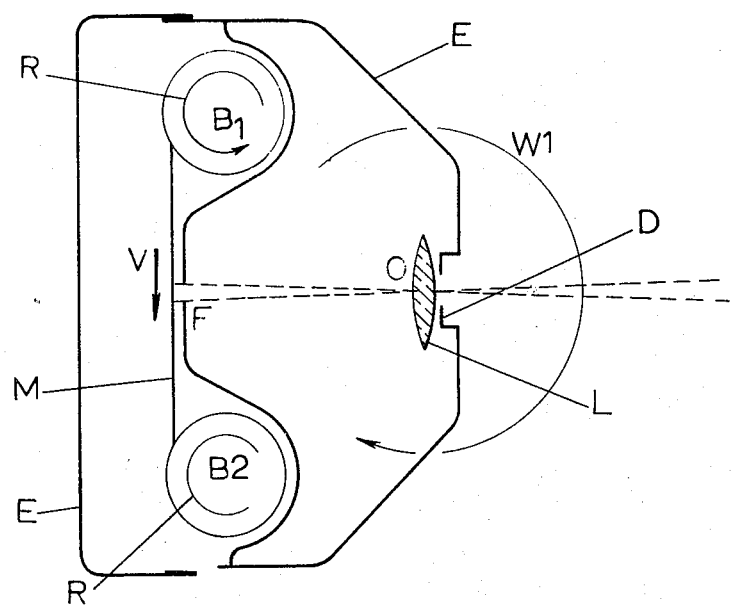
FIG. 8 is a diagrammatic horizontal sectional view through a camera embodying the method of the invention.

Referring to FIGS. 8 and 9 therein is seen a camera according to the invention comprising a casing E mounted on a base N which can be a grip, tripod or other support, such as of the gyroscopic type, to maintain it fixed or parallel to itself. The camera is turnably mounted on the base for rotation about an axis to sweep the entire desired panorama to be photographed. Film M to be exposed is mounted in the camera and is driven along a film guide so that successive small lengths of the film are continuously exposed. The direction and speed of rotation of the camera $W_1$ is such that the net speed of travel of the film is substantially zero and the center of the film on the optical axis of lens L is an instantaneous center of rotation.

More specifically, there is seen in casing E, a supply spool $B_1$ for unexposed film and a take-up spool $B_2$ for the film just exposed. The casing E is driven by a motor or other suitable means (not shown) and it revolves at a speed $W_1$ around axis O, which passes through the optical center of the objective lens. Although in principle the axis is preferably so disposed, it may be offset for certain purposes.

Figure 10:
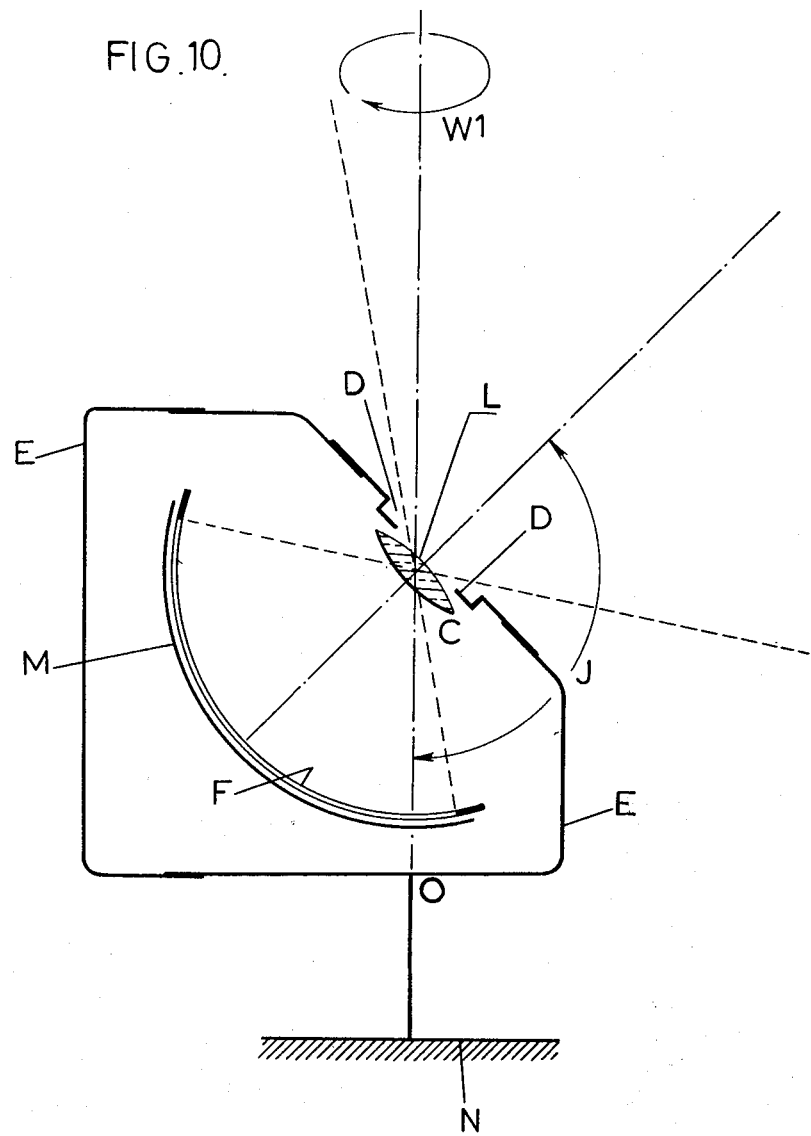
FIG. 10 is a view similar to FIG. 9 of a modified apparatus.

The optical axis of the objective intersects the axis of rotation O of the camera and is perpendicular thereto as seen in FIG. 9. The angle J in FIGS. 9 and 10 is thus 90° and this can be varied to be most suitable for the panorama or panoramic ring which it is desired to photograph, in accordance with the angle covered by the objective lens. Thus, if it is desired to cover the entire panorama above the horizon, the angle J will be greater than if it is desired to photograph only a narrow ring. This will become evident from a consideration of FIG. 10.

The film M is wound from spool $B_1$ onto spool $B_2$ and the film instantaneously passes in front of a slot or window F in the film guide which defines a passage for the incoming light. The slot F is aligned on the optical axis of the objective lens and is disposed in the plane containing the axis of rotation O and the optical axis. The direction of travel of the film M is opposite to the direction of rotation of the camera.

The velocity V of travel of the film M in front of the slot F is synchronized with the speed of rotation $W_1$ such that the linear velocity of the film at the center of slot F due to rotation of the camera (angular speed of rotation $W_1$ multiplied by the distance along the optical axis from axis O to the film M) is substantially equal and opposite the velocity V. Hence the region of the film which is in front of the slot F for exposure has substantially a net zero velocity relative to the support N of the camera. For optical effects, it may be desired to provide a relatively small net velocity of the film in which case enlargement or reduction of the photographed image will be obtained in the direction of travel depending on the sense of direction.

The rotational movement of the camera which may be about a vertical or inclined axis (for the latter, it will be sufficient, of course, to incline the support of the camera) can be produced by a mechanical or electrical drive, and its velocity $W_1$ may be constant or variable and adjusted by means of manual or mechanical regulation through a mechanical, electrical or electronic control mounted on the camera itself or situated at a distance therefrom.

Such control will permit photographing only a particular fraction of a complete 360° circle or permit several revolutions of the camera according to the extent of the panoramic view which it is desired to photograph. For such purpose contacts can be provided for starting or stopping where and when desired.

The driving means for rotating the camera around axis O may be of the "freewheel" type to facilitate the handling of the camera, particularly when it is desired to take photographs only of sectors of the panorama.

The slot F for passage of the light rays should be rather narrow in relation to the aperture of the objective lens and be disposed in its focal plane for absolute sharpness of the image to be taken with "snapshot" rapidity. It may be planar (as shown in FIG. 9) or cylindrical (as shown in FIG. 10) with adjustable curvature and, in either case, its width may also be varied according to its direction. A filter can be employed for better distribution of the light across the slot F and the filter can be mounted, as is conventional, on the objective lens. In the simplest case, however, it will not be necessary to curve the slot, to enable it to be adjustable in width or to place a filter in front of it. It is not necessary for the slot F to be symmetrical in relation to the optical axis of the objective lens, and it is suitable, for example, as shown in FIG. 9 to place the objective lens above the mid-height of the window if a fairly large zone of the panorama above the horizon is to be photographed or if a low panorama is to be photographed from a high point. In all cases, of course, the range of the objective lens must be taken into account.

The aperture of the diaphragm D may be varied as in conventional cameras.

The regulation of the slot F and of the diaphragm D can be effected by mechanical or electronic and automatic devices which are provided, for example, with a photoelectric cell, and dependent on the luminosity, the film sensitivity, and the speed of the objects to be photographed.

Since the camera is rotating and only a small strip of the film is exposed to the light-rays, a shutter is not needed, except for the operation of rewinding the exposed film if the window F is not automatically closed.

The speed $W_1$ may vary within wide limits, however, a speed of at least about 1 revolution per second being generally sufficient.

Thus, for an objective lens having a focal length $R = 50$ mm; a width of slot $F = 1.5$ mm and a speed $W_1 = 1.9$ revolutions per second, one obtains a panoramic photograph in which the snapshot covered by the slot has the duration $$i = \frac{F}{W_1 \times d} = \frac{F}{W_1 \times 2\pi \times R}$$

$$= \frac{1.5}{1.9 \times 2 \times 3.14 \times 50} = \frac{1}{400} \text{ sec}$$

In a prototype, impeccable photographs were obtained with $W_1 = 1$ revolution/sec. $F = 3$ mm, diaphragm aperture $D = f_{11}$ or $f_{16}$, and with films of sensitivity 16 and 32 DIN.

The above is applicable for a continuous, total panoramic, distortion-free filming process. It is sufficient to impart to the camera a speed of rotation $W_1$ corresponding to that at which it is desired to film and to equip the camera with film in a quantity corresponding to the total number of revolutions of the machine to be made in the prescribed filming time.

Since total rotation panoramic filming is contemplated, the consumption of film will be high, making it necessary to use spools of high capacity and to make provision to reduce or eliminate the centrifugal forces which result from the rotation of the camera.

In small or amateur machines, the spools may both be centered on the axis of rotation of the camera and be located above and below the objective, the film passing in opaque channels and being guided by rollers to pass in front of the window F. In this way, since the masses of the film are always centered on the axis of rotation and are disposed symmetrically in relation thereto, the centrifugal forces are diametrically opposed in pairs and cancel one another. Moreover, since the objective lens revolves about its optical center, the inertia forces of the eccentric masses will be small and able to be easily compensated.

In large or professional machines, the above arrangement may also be adopted. Alternatively:

a. the unexposed film supply spool and the exposed film take-up spool can again be substantially centered on the axis of rotation, however, they need not revolve with the camera.

In fact, at each instant, the speed of rotation of the spool is only $1/2\pi$ of the difference between the radius of circumference of the film spiral and the focal length of the objective, and hence negligible as far as the inertia forces are concerned.

b. the unexposed film supply spool and the exposed film take-up spool can be mounted coaxially in superposed beds with the film alternately connected at its outer and inner spiral turns to the respective spools; thus winding and unwinding may be from the inside to the outside respectively or vice versa.

For example, when filming at a speed $W_1 = 16$ revolutions per second using a camera having an objective of focal length $R = 25$ mm and a slot aperture $F = 12.5$ mm, there is a snapshot speed of $$i = \frac{12.5}{16 \times 2 \times 3.14 \times 25} = 1/200 \text{ sec}$$

This is adequate for general filming as the diaphragm of the lens can be adjusted to the most appropriate aperture opening.

For projecting purposes, in which capability for complete revolution is provided, it is contemplated, similar to the filming operation, to place the now exposed film in a projector which is constructed similar to the camera and to illuminate the film in front of the window F while continuously rotating the projector and projecting the images on screen P. The screen can be a portion of a spherical surface, an annular ring or a sector.

The speed of rotation of the projector must be such that it is correlated to the phenomena of persistence of vision so the image will be retained in the retina as in conventional cinematographic projection. Namely a speed of 16 revolutions per second is suitable, corresponding to the 16 frames per second considered to be the minimum, or 18 frames per second in the case of sound films.

Figure 11:
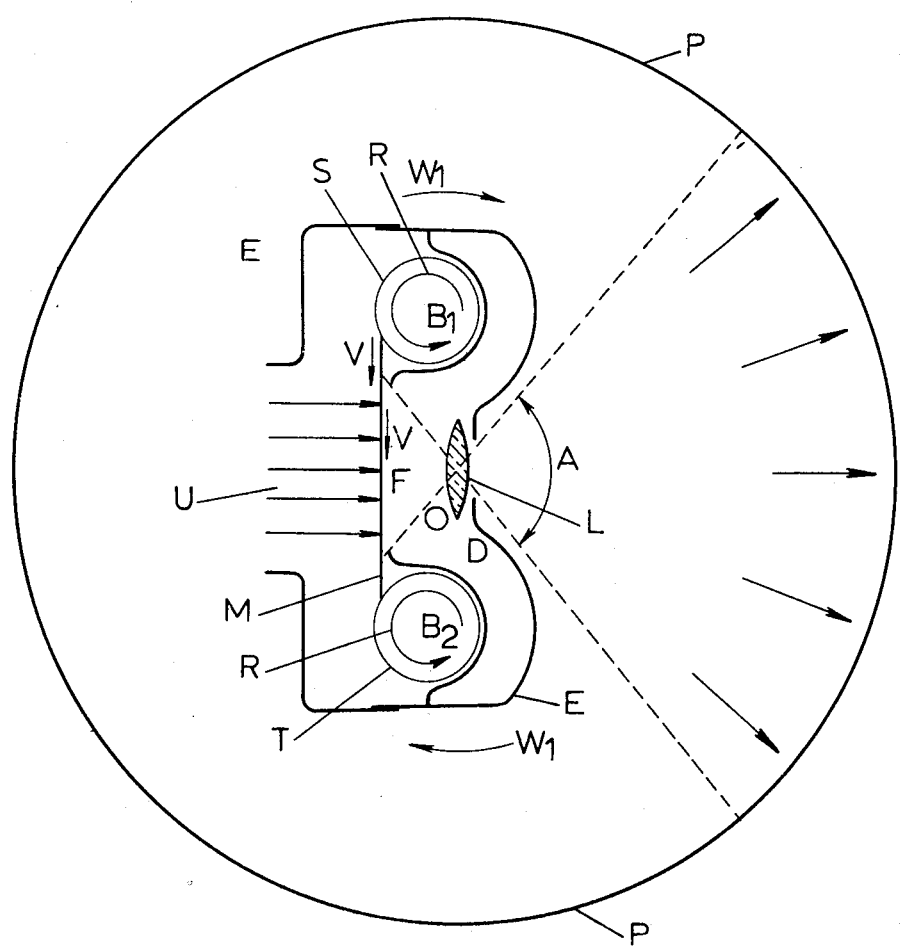
FIG. 11 is a diagrammatic horizontal sectional view through a projector embodying the method of the invention.

The projector is shown in FIG. 11 and like the camera, the projector revolves about an axis which passes through the optical center O of the objective lens L, the exposed film passing from supply spool S to take-up spool T, such that the net velocity of the film when it passes in front of the window F is substantially zero. The window is illuminated from behind by a light beam U and the image of the film is projected onto the screen P at the rate of 16 or more images per second and preferably 24 images per second.

The number of times, in each second, that the total image is projected on the panoramic screen P is, as has been said, equal to the number which expresses the speed of rotation $W_1$ of the projector in revolutions per second. This image is maintained at every point on the screen for a fraction of a second equal to the ratio $A/360$, where A is the angle of the light beam which passes through the slot F expressed in degrees. A sufficient time for perfect visibility is given the sequence of the images, since A may be of the order of 60° to 120° whereupon $A/360$ is equal to a value between 1/6 to 1/3.

Thus, the luminosity and the color of the images will be within acceptable limits and can be duly compensated.

With regard to the magnitude of the forces generated by the parts in motion, that which has been stated above for the construction of the camera, applies hereto, and in this case it becomes simpler because the film need not be protected from extraneous light. Also the light source can be fixed and its orientation toward the film effected through mirrors and prisms and only these need follow the movement of the projector, so that the generated centrifugal forces are of no significance.

When filming in 24 mm format (which in conventional moviemaking corresponds to 35 mm film) and with an objective lens of a focal length of 15 mm, at a speed of 16 images per second, 1 hour of projection corresponds to 5400 meters of film as shown hereafter.

Film length = $2 \times 3.1416 \times 0.015 \times 16 \times 60^2 = 5400$ m. This is not excessive, since total panoramic projection is achieved. Analogously, for objectives of 25 mm and 24 images per second, with 35 mm film 13,600 meters of film is required.

In use, the entire panoramic field appears as a continuous image on the circular screen. The image will continuously change, as in conventional cinematographic film-making, and as has been shown above, the images can be made clear, bright and free from distortion. This offers numerous advantages over conventional prior art techniques where complex lens arrangements or multiple camera arrangements are employed to film a large panoramic screen.

Although the invention has been described in relation to numerous embodiments thereof, it will be understood that modifications and variations thereof will become evident to those skilled in the art which fall within the scope and spirit of the invention as defined by the appended claims.

What is claimed is:

1. A process for effecting panoramic photography with a photographic instrument having an objective lens with an optical axis, an aperture in front of the lens, and an apertured film guide in back of the lens for travel of film therealong, said process comprising uniformly advancing the film continuously along the guide at a predetermined constant rate of speed whereby successive portions of the film are continuously exposed through the aperture in the film guide, and rotating the instrument independently of the advancing of the film on a fixed support about an axis passing through the lens and extending at an angle to the optical axis, the direction and speed of rotation of the instrument relative to said support being such that the net velocity of travel of the film relative to said support is substantially zero.

2. A process as claimed in claim 1 wherein said instrument is a camera and the film is exposed to the image revealed through the lens during travel of the instrument about said axis or rotation.

3. A process as claimed in claim 1 wherein said film guide is flat.

4. A process as claimed in claim 1 wherein said film guide is curved.

5. A process as claimed in claim 1 wherein the axis of rotation is perpendicular to the optical axis of the lens.

6. A process as claimed in claim 1 wherein the axis of rotation is inclined with respect to the optical axis of the lens.

7. A process as claimed in claim 1 wherein said instrument is a projector and an image on the film is projected through the lens during travel of the instrument about said axis of rotation.

8. A process as claimed in claim 7 wherein the speed of rotation of the projector is correlated to the phenomena of persistence of vision so that a continuous image appears to be projected.

9. A process as claimed in claim 1 wherein a relatively small net speed of travel of the film is provided to effect enlargement or reduction of the image along the direction of travel and depending on the sense of direction.

10. A process as claimed in claim 1 wherein a narrow slot is formed in said film guide at a location in alignment along the optical axis and in front of the path of travel of the film.

11. A process as claimed in claim 1 wherein the axis of rotation of the instrument is positioned between the instrument aperture and the film guide.

* * * * *